(12) United States Patent
Asano et al.

(10) Patent No.: US 11,309,584 B2
(45) Date of Patent: Apr. 19, 2022

(54) ELECTROLYTE SOLUTION FOR LITHIUM SECONDARY BATTERIES, AND LITHIUM SECONDARY BATTERY

(71) Applicant: TOYOTA JIDOSHA KABUSHIKI KAISHA, Toyota (JP)

(72) Inventors: Hiroto Asano, Nisshin (JP); Shimpei Kondo, Nagoya (JP)

(73) Assignee: TOYOTA JIDOSHA KABUSHIKI KAISHA

( * ) Notice: Subject to any disclaimer, the term of this patent is extended or adjusted under 35 U.S.C. 154(b) by 178 days.

(21) Appl. No.: 16/695,859

(22) Filed: Nov. 26, 2019

(65) Prior Publication Data
US 2020/0194835 A1 Jun. 18, 2020

(30) Foreign Application Priority Data
Dec. 18, 2018 (JP) .............................. JP2018-236494

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01)

(58) Field of Classification Search
CPC ......... H01M 10/0567; H01M 10/0525; H01M 2300/004; H01M 10/0566; H01M 10/052; H01M 2300/00; Y02E 60/10
USPC ........................................................ 429/188
See application file for complete search history.

(56) References Cited

U.S. PATENT DOCUMENTS

| 2012/0308881 | A1 | 12/2012 | Tokuda et al. |
| 2015/0024247 | A1* | 1/2015 | Lockett ................. H01M 10/32 429/124 |
| 2016/0027592 | A1 | 1/2016 | Shimamoto et al. |
| 2017/0222268 | A1 | 8/2017 | Abe et al. |

FOREIGN PATENT DOCUMENTS

| JP | 2011-187440 A | 9/2011 |
| JP | 2015159120 A | 9/2015 |
| WO | 2016/009994 A1 | 1/2016 |

* cited by examiner

*Primary Examiner* — Gary D Harris
(74) *Attorney, Agent, or Firm* — Dickinson Wright PLLC

(57) ABSTRACT

Provided is an electrolyte solution for lithium secondary batteries that allows lowering the resistance of a lithium secondary battery, and suppressing characteristic degradation of the lithium secondary battery under high temperature. The electrolyte solution for lithium secondary batteries disclosed herein contains 0.05 mass % to 2.0 mass % of a compound represented by Formula (1) below. (In the formula, $M^+$ represents a quaternary ammonium cation or a nitrogen-containing heteroaromatic ring cation, and $R^1$ represents a $C_1$-$C_5$ alkyl group in which an ether oxygen is optionally inserted.)

[C1]

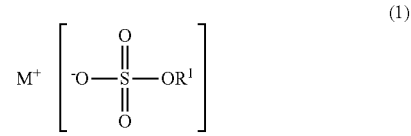

(1)

3 Claims, 2 Drawing Sheets

ELECTROLYTE SOLUTION FOR LITHIUM SECONDARY BATTERIES, AND LITHIUM SECONDARY BATTERY

BACKGROUND OF THE INVENTION

1. Field of the Invention

The present teaching relates to an electrolyte solution for lithium secondary batteries. The present teaching relates also to a lithium secondary battery provided with the electrolyte solution. The present application claims priority to Japanese Patent Application No. 2018-236494 filed on Dec. 18, 2018, the entire contents whereof are incorporated herein by reference.

2. Description of the Related Art

In recent years, lithium secondary batteries have come to being suitably used as portable power sources in personal computers, mobile terminals and the like, as power sources for vehicle drive in electric vehicles (EV), hybrid vehicles (HV) and plug-in hybrid vehicles (PHV), and also as power sources for power storage.

Further improvements in performance are demanded from lithium secondary batteries as the use of these has become widespread. One approach for enhancing performance involves improving an electrolyte solution. As an example thereof, Japanese Patent Application Publication No. 2011-187440 discloses the feature of adding a fluorosulfonate salt such as tetraethylammonium fluorosulfonate to an electrolyte solution, to thereby improve initial charge capacity and input-output characteristics.

SUMMARY OF THE INVENTION

However, detailed studies by the inventors have revealed that the above conventional art is problematic in that lowering of initial resistance is insufficient, and in that battery characteristics worsen when the battery is allowed to stand for long periods of time under high temperature.

In the light of the above, it is an object of the present teaching to provide an electrolyte solution for lithium secondary batteries that allows lowering the resistance of a lithium secondary battery, and suppressing characteristic degradation of the lithium secondary battery under high temperature.

The electrolyte solution for lithium secondary batteries disclosed herein contains 0.05 mass % (inclusive) to 2.0 mass % (inclusive) of a compound represented by Formula (1) below.

[C1]

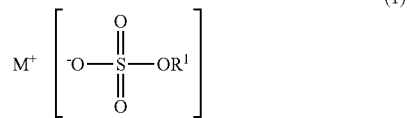

(1)

(In the formula, $M^+$ represents a quaternary ammonium cation or a nitrogen-containing heteroaromatic ring cation, and $R^1$ represents a $C_1$-$C_5$ alkyl group in which an ether oxygen is optionally inserted.)

By virtue of this configuration, an electrolyte solution for lithium secondary batteries is provided that allows lowering the resistance of a lithium secondary battery, and suppressing characteristic degradation of the lithium secondary battery under high temperature.

In a desired implementation of the electrolyte solution for lithium secondary batteries disclosed herein, the compound represented by Formula (1) is at least one selected from the group consisting of 1-ethyl-3-methylimidazolium methyl sulfate, 1-ethyl-3-methylimidazolium ethyl sulfate, 1,3-dimethylimidazolium methyl sulfate, and 1-butyl-3-methylimidazolium methylsulfate.

The effect of the present teaching is more pronounced in that case.

In a desired implementation of the electrolyte solution for lithium secondary batteries disclosed herein, the content of the compound represented by Formula (1) is 0.5 mass % (inclusive) to 1.0 mass % (inclusive).

The effect of the present teaching is more pronounced in that case.

The lithium secondary battery disclosed herein is provided with the above electrolyte solution for lithium secondary batteries.

By virtue of that configuration, a lithium secondary battery is provided that exhibits low initial resistance and in which characteristic degradation under high temperature is suppressed.

DESCRIPTION OF THE PREFERRED EMBODIMENTS

Figure 1:
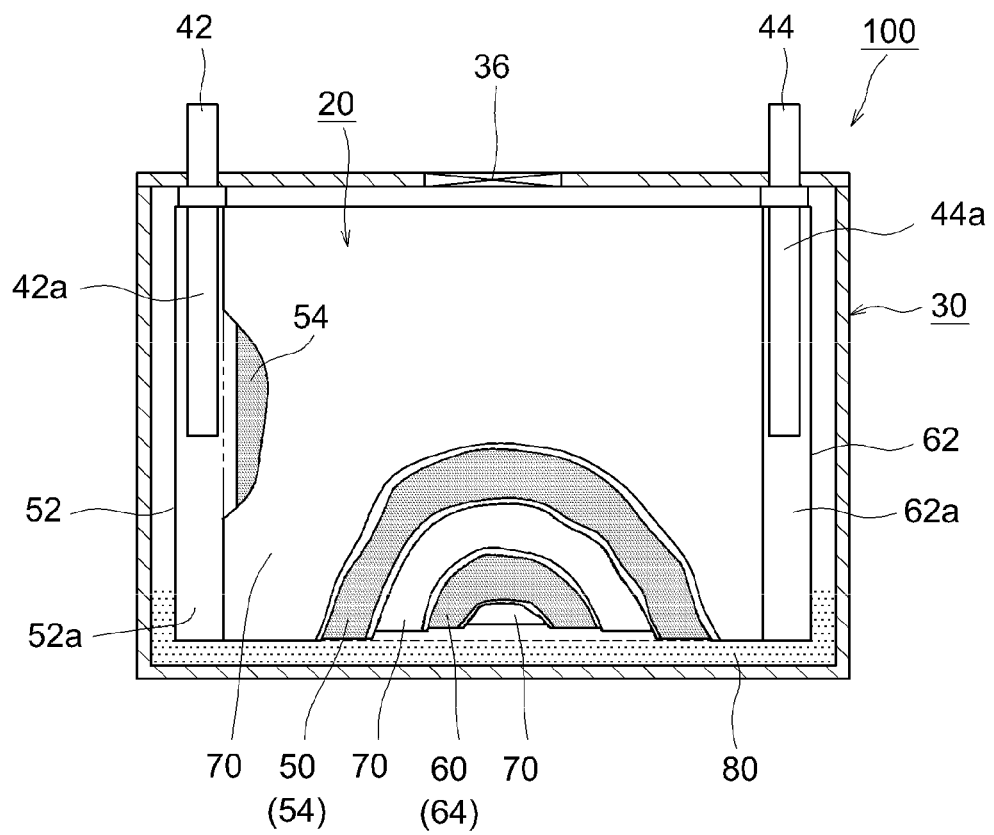
FIG. 1 is a cross-sectional diagram illustrating schematically the internal structure of a lithium secondary battery that utilizes an electrolyte solution for lithium secondary batteries according to an embodiment of the present teaching.

Embodiments of the present teaching will be explained next. Any features other than the matter specifically set forth in the present specification and that may be necessary for carrying out the present teaching (for instance ordinary configurations and production processes of nonaqueous electrolyte solutions and not being characterizing features of the teaching) can be regarded as instances of design matter for a person skilled in the art based on known techniques in the technical field in question. The teaching can be realized on the basis of the disclosure of the present specification and common technical knowledge in the relevant technical field.

In the present specification, the term "secondary battery" denotes an electric storage device in general that is capable of being charged and discharged repeatedly, and encompasses so-called storage batteries and electric storage elements such as electrical double layer capacitors.

In the present specification, further, the term "lithium secondary battery" denotes a secondary battery that utilizes lithium ions as charge carriers, and that is charged and discharged as a result of movement of charge with lithium ions, between a positive electrode and a negative electrode.

The electrolyte solution for lithium secondary batteries according to the present embodiment contains 0.05 mass % to 2.0 mass % of a compound represented by Formula (1) below. As Formula (1) indicates, the compound represented by Formula (1) is a salt of a cation represented by $M^+$ and an anion represented by $R^1OSO_3^-$.

[C2]

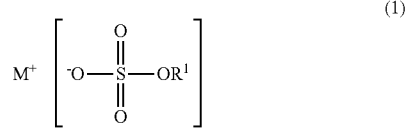
(1)

In Formula (1), $M^+$ represents a quaternary ammonium cation or a nitrogen-containing heteroaromatic ring cation, and $R^1$ represents a $C_1$-$C_5$ alkyl group in which an ether oxygen is optionally inserted.

The compound represented by Formula (1) includes compounds referred to as ionic liquids. It is known that ionic liquids can be used as nonaqueous solvents of electrolyte solutions for lithium secondary batteries. As a result of diligent research, the inventors found that by adding a small amount of the compound represented by Formula (1), as an additive, to the electrolyte solution for lithium secondary batteries, it becomes possible to lower the resistance of a lithium secondary battery in which the electrolyte solution is used, and to suppress characteristic degradation in the lithium secondary battery under high temperature.

The reasons why such a prominent and advantageous effect is elicited are unclear. The inventors carried out however various analyses on lithium secondary batteries that utilized the above electrolyte solution, and found, on the basis of XPS measurements, that SOx derived from the anion represented by $R^1OSO_3^-$ is present in a coating film that is formed on electrode surfaces. The XPS measurement, on the other hand, did not reveal the presence of the element derived from the cation in the coating film formed on the electrode surface. Accordingly, it is deemed that a hybridized coating film, modified through uptake of a suitable amount of SOx derived from the anion represented by $R^1OSO_3^-$, becomes formed on electrodes as a result of the use of a small amount of the compound represented by Formula (1), as an additive, in the electrolyte solution for lithium secondary batteries. In consequence, the resistance of the lithium secondary battery can be lowered and characteristic degradation of the lithium secondary battery under high temperature can be suppressed.

In a case where $M^+$ is a quaternary ammonium cation, the quaternary ammonium cation is represented by $N(R^2)_4^+$. Desirably, $R^2$s are each a $C_1$-$C_{12}$ alkyl group, or two $R^2$s are bonded to each other to form a heterocyclic ring with the nitrogen atom to which $R^2$s are bonded.

The $C_1$-$C_{12}$ alkyl group represented by $R^2$ may be linear, branched or cyclic. Examples thereof include a methyl group, an ethyl group, a propyl group, an isopropyl group, a butyl group, an iso-butyl group, a tert-butyl group, a pentyl group, an iso-pentyl group, a tert-pentyl group, a hexyl group, a cyclohexyl group, a heptyl group, a 2-ethylhexyl group, an octyl group, a nonyl group, an iso-nonyl group, a decyl group, an undecyl group and a dodecyl group. Desired among the foregoing is a $C_1$-$C_6$ alkyl group, and more desirably a $C_1$-$C_4$ alkyl group.

Examples of the heterocyclic ring, in a case where two les are bonded to each other to form a heterocyclic ring with the nitrogen atom to which les are bonded, include an ethyleneimine ring, an azacyclobutane ring, a pyrrolidine ring, a piperidine ring, a hexamethylene imine ring, a heptamethylene imine ring and an octanemethylene imine ring. Desired among the foregoing are a pyrrolidine ring and a piperidine ring, more desirably a pyrrolidine ring. Two of the above heterocyclic rings may be formed, but desirably one heterocyclic ring is formed, and the remaining two $R^2$s are each $C_1$-$C_6$ (in particular, $C_1$-$C_4$) alkyl groups.

In a case where $M^+$ is a nitrogen-containing heteroaromatic ring cation, examples of the nitrogen-containing heteroaromatic ring include a pyrrole ring, a pyridine ring, a pyrimidine ring, a pyrazine ring, an N-substituted imidazole ring, an N-substituted pyrazole ring and an N-substituted triazole ring. In a case where the nitrogen-containing heteroaromatic ring is N-substituted, the heteroaromatic ring is desirably N-substituted with a $C_1$-$C_6$ alkyl group, and more desirably with a $C_1$-$C_4$ alkyl group. The $C_1$-$C_6$ alkyl group may be linear, branched or cyclic; examples thereof include a methyl group, an ethyl group, a propyl group, an isopropyl group, a butyl group, an iso-butyl group, a tert-butyl group, a pentyl group, an iso-pentyl group, a tert-pentyl group, a hexyl group and a cyclohexyl group.

Desirably, $M^+$ is an ammonium cation having four $C_1$-$C_4$ alkyl groups, a pyrrolidinium cation having two $C_1$-$C_4$ alkyl groups or an imidazolium cation substituted with a $C_1$-$C_6$ alkyl group. Among the foregoing, an imidazolium cation substituted with a $C_1$-$C_6$ alkyl group is more desired, and an imidazolium cation substituted with a $C_1$-$C_4$ alkyl group is yet more desired, since in that case the effect of lowering the resistance of the lithium secondary battery is particularly pronounced.

The number of ether oxygens inserted in the $C_1$-$C_5$ alkyl group represented by $R^1$ is not particularly limited, but is desirably two or fewer. The $C_1$-$C_5$ alkyl group may be linear or branched, and examples thereof include a methyl group, an ethyl group, a propyl group, an isopropyl group, a butyl group, an iso-butyl group, a tert-butyl group, a pentyl group, an iso-pentyl group, a tert-pentyl group, a methoxymethyl group, a methoxyethyl group, an ethoxymethyl group, an ethoxyethyl group, a dimethoxymethyl group and a methyldi(oxyethylene) group. Desirably, $R^1$ is a methyl group or ethyl group, and more desirably a methyl group, since in that case the effect of the present teaching is particularly pronounced.

The electrolyte solution for lithium secondary batteries according to the present embodiment may contain one single type of the compound lying within the scope of Formula (1), or may contain two or more such compounds. Particularly desirably, the compound represented by Formula (1) is at least one selected from the group consisting of 1-ethyl-3-methylimidazolium methyl sulfate, 1-ethyl-3-methylimidazolium ethyl sulfate, 1,3-dimethylimidazolium methyl sulfate, and 1-butyl-3-methylimidazolium methyl sulfate, since in that case the effect of the present teaching can be brought out at a particularly high level.

The content of the compound represented by Formula (1) in the electrolyte solution for lithium secondary batteries according to the present embodiment is 0.05 mass % to 2.0 mass %. When the above content is lower than 0.05 mass %, the initial resistance of the lithium secondary battery is high, and degradation of battery characteristics under high temperature cannot be suppressed sufficiently. Desirably, the above content is 0.5 mass % or higher. When on the other hand the above content exceeds 2.0 mass %, the initial resistance of the lithium secondary battery is high, and degradation of battery characteristics under high temperature cannot be sufficiently suppressed. Desirably, the above content is 1.0 mass % or lower.

The electrolyte solution for lithium secondary batteries according to the present embodiment ordinarily contains a nonaqueous solvent and a supporting salt.

A known nonaqueous solvent used as a nonaqueous solvent in electrolyte solutions for lithium secondary batteries can be used herein. Concrete examples thereof include carbonates, ethers, esters, nitriles, sulfones and lactones. Desired among the foregoing are carbonates. Examples of carbonates include ethylene carbonate (EC), propylene carbonate (PC), diethyl carbonate (DEC), dimethyl carbonate (DMC) and ethyl methyl carbonate (EMC). The foregoing can be used singly or in combinations of two or more types.

A known salt utilized as a supporting salt in electrolyte solutions for lithium secondary batteries can be used herein as the supporting salt. Concrete examples thereof include $LiPF_6$, $LiBF_4$, lithium bis(fluorosulfonyl)imide (LiFSI) and lithium bis(trifluoromethane)sulfone imide (LiTFSI). The concentration of the supporting salt in the electrolyte solution is not particularly limited, and is, for instance, 0.5 mol/L to 5 mol/L, desirably 0.7 mol/L to 2.5 mol/L, and more desirably 0.7 mol/L to 1.5 mol/L.

The nonaqueous electrolyte solution for lithium secondary batteries according to the present embodiment may contain other components, so long as the effect of the present teaching is not significantly impaired thereby. Examples of such other components include gas generating agents such as biphenyl (BP) and cyclohexylbenzene (CHB); film-forming agents; dispersants; and thickeners.

The electrolyte solution for lithium secondary batteries according to the present embodiment can be prepared by mixing the above components in accordance with a known method.

The electrolyte solution for lithium secondary batteries according to the present embodiment can be used in lithium secondary batteries in accordance with a known method.

The electrolyte solution for lithium secondary batteries of the present embodiment described herein allows lowering resistance in a lithium secondary battery, and suppressing characteristic degradation in the lithium secondary battery under high temperature.

In another aspect, therefore, the lithium secondary battery disclosed herein is a secondary battery provided with the electrolyte solution for lithium secondary batteries according to the present embodiment.

As an example, an explanation follows next, with reference to accompanying drawings, on the schematic configuration of a lithium secondary battery provided with an electrolyte solution for lithium secondary batteries according to the present embodiment. In the drawings below, members and portions that elicit identical effects are denoted with identical reference symbols. The dimensional relationships (length, width, thickness and so forth) in the drawings do not reflect actual dimensional relationships.

The lithium secondary battery 100 illustrated in FIG. 1 is a sealed-type battery constructed in such a manner that a flat wound electrode body 20 and an electrolyte solution 80 are accommodated in a flat square battery case (i.e. outer container) 30. The battery case 30 is provided with a positive electrode terminal 42 and a negative electrode terminal 44 for external connection, and with a thin-walled safety valve 36 configured so as to relieve internal pressure in the battery case 30 when the internal pressure rises to a predetermined level or above. The battery case 30 is provided with an injection port (not shown) for injection of the electrolyte solution 80. The positive electrode terminal 42 is electrically connected to a positive electrode collector plate 42a. The negative electrode terminal 44 is electrically connected to a negative electrode collector plate 44a. For instance, a lightweight metallic material of good thermal conductivity, such as aluminum, is used as the material of the battery case 30.

Figure 2:
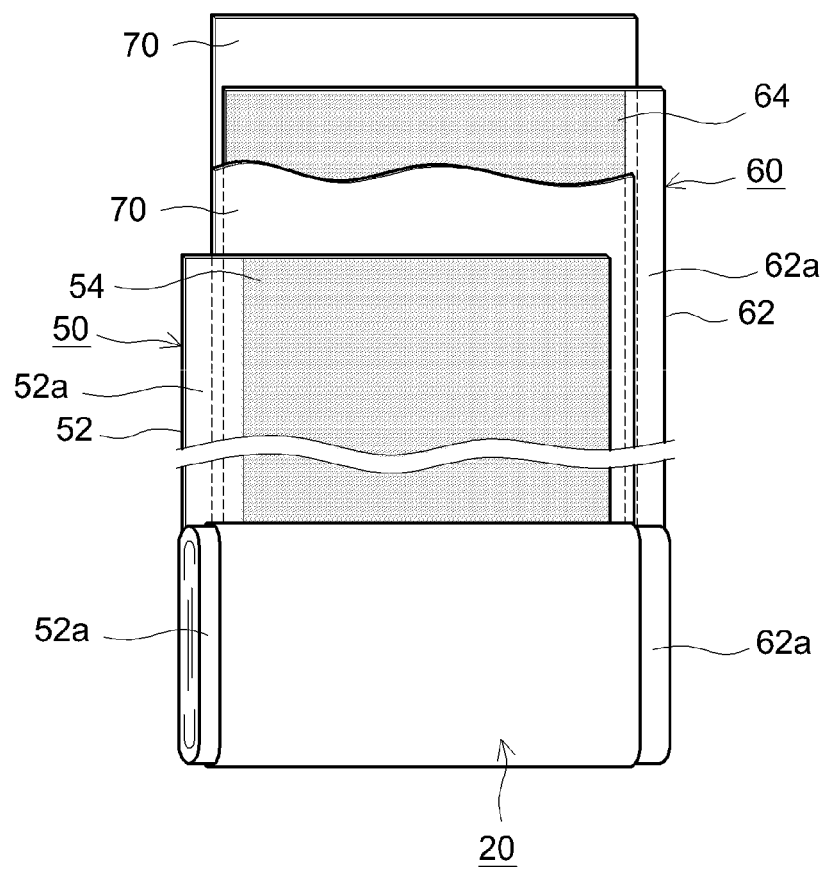
FIG. 2 is a schematic diagram illustrating schematically the configuration of a wound electrode body of the lithium secondary battery of FIG. 1.

As illustrated in FIG. 1 and FIG. 2, the wound electrode body 20 is of a form that results from superimposing a positive electrode sheet 50 in which a positive electrode active material layer 54 is formed along the longitudinal direction on one face or both faces (herein both faces) of an elongated positive electrode collector 52, and a negative electrode sheet 60 in which a negative electrode active material layer 64 is formed along the longitudinal direction on one face or both faces (herein both faces) of an elongated negative electrode collector 62, with two elongated separator sheets 70 interposed in between, and from winding then the resulting stack in the longitudinal direction. The positive electrode collector plate 42a and the negative electrode collector plate 44a are respectively joined to a positive electrode active material layer non-formation section 52a (i.e. exposed portion of the positive electrode collector 52 at which the positive electrode active material layer 54 is not formed) and a negative electrode active material layer non-formation section 62a (i.e. exposed portion of the negative electrode collector 62 at which the negative electrode active material layer 64 is not formed) that are formed so as to protrude outward from both edges of the wound electrode body 20 in the winding axis direction thereof (i.e. sheet width direction perpendicular to the longitudinal direction).

Sheets similar to those used in conventional lithium secondary batteries can be used, without particular limitations, as the positive electrode sheet 50 and the negative electrode sheet 60. One typical implementation is described below.

Examples of the positive electrode collector 52 that makes up the positive electrode sheet 50 include, for instance, an aluminum foil. Examples of the positive electrode active material contained in the positive electrode active material layer 54 include lithium-transition metal oxides (for example, $LiNi_{1/3}Co_{1/3}Mn_{1/3}O_2$, $LiNiO_2$, $LiCoO_2$, $LiFeO_2$, $LiMn_2O_4$ and $LiNi_{0.5}Mn_{1.5}O_4$) and lithium-transition metal phosphate compounds (for example $LiFePO_4$). The positive electrode active material layer 54 can contain components other than the active material, for instance, a conductive material and a binder. As the conductive material, for instance, carbon black such as acetylene black (AB) or other carbon materials (for example graphite) can be suitably used. For instance, polyvinylidene fluoride (PVDF) can be used as the binder.

For instance, a copper foil can be used as the negative electrode collector 62 that makes up the negative electrode sheet 60. A carbon material such as graphite, hard carbon or soft carbon can be used as the negative electrode active material contained in the negative electrode active material layer 64. Graphite is desirable among the foregoing. Graphite may be natural graphite or artificial graphite, and may be coated with an amorphous carbon material. The negative electrode active material layer 64 can contain components other than the active material, for instance, a binder or a thickener. For instance, styrene butadiene rubber (SBR) can be used as the binder. For instance, carboxymethyl cellulose (CMC) can be used as the thickener.

A porous sheet (film) made of a polyolefin such as polyethylene (PE) and polypropylene (PP) can be used as a separator 70. The porous sheet may have a single-layer structure, or a multilayer structure of two or more layers (for instance a three-layer structure in which a PP layer is laid on both faces of a PE layer). A heat-resistant layer (HRL) may be provided on the surface of the separator 70.

The air permeability of the separator 70, obtained by a Gurley test method, is not particularly limited, but is desirably 350 seconds/100 cc or less.

The above-described electrolyte solution for lithium secondary batteries according to the present embodiment is used as the electrolyte solution 80. FIG. 1 does not strictly indicate the amount of electrolyte solution 80 that is injected into the battery case 30.

The lithium secondary battery 100 configured as described above can be used in various uses. Examples of desired uses include drive power sources mounted on vehicles such as electric vehicles (EV), hybrid vehicles (HV) and plug-in hybrid vehicles (PHV). The lithium secondary battery 100 can be typically used embodied as an assembled battery resulting from connection of a plurality of batteries in series and/or in parallel.

A square lithium secondary battery 100 provided with a flat wound electrode body 20 has been explained above as an example. However, the lithium secondary battery can be configured in the form of a lithium secondary battery having a stacked-type electrode body. The lithium secondary battery can also be configured, for instance, as a cylindrical lithium secondary battery or a laminate-type lithium secondary battery.

Examples pertaining to the present teaching will be explained next, but the present teaching is not meant to be limited to these examples.

Production of Electrolyte Solution

As a non-aqueous solvent, a mixed solvent containing ethylene carbonate (EC), dimethyl carbonate (DMC) and ethyl methyl carbonate (EMC) in a volume ratio of 30:40:30 is provided. Then, $LiPF_6$ as a supporting salt was dissolved, to a concentration of 1.0 mol/L, in this mixed solvent, and each additive set out in Table 1 was dissolved in a resulting solution, at the contents given in Table 1, to produce respective electrolyte solutions of examples and comparative examples.

Production of Lithium Secondary Battery for Evaluation

Herein $LiNi_{1/3}Co_{1/3}Mn_{1/3}O_2$ (LNCM) as a positive electrode active material powder, acetylene black (AB) as a conductive material and polyvinylidene fluoride (PVdF) as a binder were mixed, at a mass ratio of LNCM:AB:PVdF=87:10:3, with N-methylpyrrolidone (NMP), to prepare a slurry for forming positive electrode active material layer. This slurry was applied on an aluminum foil, and was dried, to produce a positive electrode sheet.

Further, a natural graphite-based carbon material (C) having an average particle size of 20 μm, as a negative electrode active material, styrene butadiene rubber (SBR) as a binder and carboxymethyl cellulose (CMC) as a thickener were mixed, at a mass ratio of C:SBR:CMC=98:1:1, with ion-exchanged water, to prepare a slurry for forming negative electrode active material layer. This slurry was applied on a copper foil, and was dried, to produce a negative electrode sheet.

A polyolefin porous film having a PP/PE/PP three-layer structure and an air permeability of 300 seconds/100 cc, obtained in accordance with the Gurley test method, was prepared as a separator.

The produced positive electrode sheet and negative electrode sheet were laid opposing each other across the separator, to produce an electrode body.

Collectors were attached to the produced electrode body; thereafter, the whole was accommodated in a laminate case, together with each electrolyte solution produced above, and the case was sealed. Lithium secondary batteries for evaluations provided with the respective electrolyte solutions of the examples and comparative examples were thus produced in the above manner.

Activation Treatment

Each lithium secondary battery for evaluation produced above was set in a thermostatic chamber at 25° C. The lithium secondary battery for evaluation was charged at constant current up to 4.10 V, at a 0.3 C current value, and thereafter was discharged at constant current down to 3.00 V, at a 0.3 C current value. This charge and discharge was repeated three times.

Initial Characteristic Evaluation

Each lithium secondary battery for evaluation thus activated was set in a thermostatic chamber at 25° C. The lithium secondary battery for evaluation was charged at constant current up to 4.10 V, at a 0.2 C current value, and thereafter was charged at constant voltage up to a current value of 1/50 C, to bring about a fully charged state (SOC 100%). The battery was thereafter discharged at constant current down to 3.00 V, at a 0.2 C current value. The discharge capacity measured at this time was taken as the initial capacity.

Each activated lithium secondary battery for evaluation was set in a thermostatic chamber at 25° C., and was then charged at constant current, at a 0.3 C current value, up to SOC 50%. Thereafter the battery was discharged for 10 seconds at current values of 5 C, 15 C, 30 C, 45 C, and the respective battery voltages were measured. The current values and voltage values were plotted, with current values on the horizontal axis and voltage values on the vertical axis, and IV resistance was worked out from the slope of the resulting linear approximation line. This IV resistance was taken as the initial resistance. The initial resistance of Comparative example 1 was set as 100, and ratios of the initial resistance of each example and each of the other comparative examples with respect thereto are calculated. The obtained ratios are given in Table 1.

High-Temperature Storage Test

Each lithium secondary battery for evaluation was charged at constant current up to SOC 100%, at a 0.3 C current value, and thereafter was stored for one month in a thermostatic chamber at 60° C. Thereafter, the discharge capacity of the lithium secondary battery for evaluation was measured in accordance with the same method as above, and the discharge capacity at that time was worked out as battery capacity after high-temperature storage. The capacity retention rate (%) was worked out on the basis of: (battery capacity after high-temperature storage/initial capacity)×100.

The IV resistance of each lithium secondary battery for evaluation (battery resistance after high-temperature storage) was measured in accordance with the same method as above. A resistance increase rate (%) was worked out on the basis of: {(resistance after high-temperature storage/initial resistance)−1}×100.

The results are given in Table 1.

TABLE 1

|  | Electrolyte solution additive | | Initial resistance ratio | Capacity retention rate after high-temperature storage (%) | Resistance increase rate after high-temperature storage (%) |
| --- | --- | --- | --- | --- | --- |
|  | Type | Content (mass %) |  |  |  |
| Example 1 | EMIm-MSfa | 1.0 | 90 | 86.8 | 5.1 |
| Example 2 | EMIm-MSfa | 0.5 | 88 | 87.7 | 5.2 |
| Example 3 | EMIm-MSfa | 0.1 | 96 | 87.0 | 7.1 |
| Example 4 | EMIm-MSfa | 0.05 | 98 | 86.2 | 10.3 |
| Example 5 | EMIm-MSfa | 2.0 | 98 | 86.2 | 7.7 |
| Example 6 | EMIm-ESfa | 0.5 | 90 | 87.6 | 6.8 |
| Example 7 | EMIm-MEESfa | 0.5 | 88 | 87.1 | 6.7 |
| Example 8 | DMIm-MSfa | 0.5 | 87 | 87.3 | 6.3 |
| Example 9 | BMIm-MSfa | 0.5 | 90 | 87.1 | 7.2 |
| Example 10 | PYR13-MSfa | 0.5 | 92 | 87.2 | 6.7 |
| Example 11 | TEA-MSfa | 0.5 | 94 | 87.3 | 7.0 |
| Comparative example 1 | No additive | 0 | 100 | 85.0 | 14.4 |
| Comparative example 2 | EMIm-FSI | 0.5 | 104 | 82.5 | 13.7 |
| Comparative example 3 | EMIm-PF6 | 0.5 | 110 | 79.3 | 15.5 |
| Comparative example 4 | EMIm-HSfa | 0.5 | 94 | 84.9 | 7.4 |
| Comparative example 5 | EMIm-MS | 0.5 | 99 | 80.7 | 7.3 |
| Comparative example 6 | EMIm-TFMS | 0.5 | 100 | 84.3 | 9.2 |
| Comparative example 7 | EMIm-MSfa | 0.02 | 100 | 85.1 | 14.6 |

Cationic Species of Electrolyte Solution Additives
EMIm: 1-ethyl-3-methylimidazolium
DMIm: 1,3-dimethylimidazolium
BMIm: 1-butyl-3-methylimidazolium
PYR13: N-methyl-N-propylpyrrolidinium
TEA: tetraethylammonium
Anionic Species of Electrolyte Solution Additives
MSfa: $CH_3OSO_3^-$
ESfa: $CH_3CH_2OSO_3^-$
MEESfa: $CH_3(OCH_2CH_2)_2OSO_3^-$
FSI: $(FSO_2)_2N^-$
PF6: $PF_6^-$
HSfa: $HSO_4^-$
MS: $CH_3SO_3^-$
TFMS: $CF_3SO_3^-$ Comparative example 1 is an example of an electrolyte solution ordinarily used in conventional art and which contains no additive. The electrolyte solutions of the examples, which contain 0.05 mass % to 2.0 mass % of the compound represented by Formula (1) as an additive yield lower initial resistance and lower resistance increase rate after high-temperature storage, and higher capacity retention rate after high-temperature storage, than those of Comparative example 1.

In Comparative examples 2 to 4, additives containing anionic species which were not the anionic species ($R^1OSO_3^-$) of Formula (1) above were added. The electrolyte solutions in Comparative examples 2 and 3 yielded higher initial resistance and higher resistance increase rate after high-temperature storage, and lower capacity retention rate after high-temperature storage, than those of the electrolyte solutions of the examples. Initial resistance, as well as resistance to characteristic degradation under high temperature, were worse than those of in Comparative example 1. In Comparative example 4, the structure of the anionic species was similar to that of the anionic species ($R^1OSO_3^-$) of Formula (1), but although an increase in resistance after high-temperature storage could be curtailed, the capacity retention rate was nevertheless low, and resistance to capacity degradation under high temperature could not be improved. Likewise an increase in resistance after high-temperature storage could be suppressed in Comparative examples 5 and 6, but the capacity retention rate was low, and resistance to capacity degradation under high temperature could not be improved.

In Comparative example 7, the addition amount of the compound represented by Formula (1) was reduced, but the initial resistance and the resistance to characteristic degradation under high temperature could not be improved. Taken together with the results of Examples 1 to 5, the above comparative example results reveal that the compound represented by Formula (1) elicits the desired effect only within a specific content range.

Further, the results of Examples 6 to 11 reveal that the desired effect is obtained even when the type of additive is modified, within the scope of the compound represented by Formula (1).

From the above, it follows that the electrolyte solution for lithium secondary batteries according to the present embodiment allows lowering resistance in a lithium secondary battery, and suppressing characteristic degradation in the lithium secondary battery under high temperature.

Concrete examples of the present teaching have been explained in detail above, but the examples are merely illustrative in nature, and are not meant to limit the scope of the claims in any way. The art set forth in the claims encompasses various alterations and modifications of the concrete examples illustrated above.

What is claimed is:

1. An electrolyte solution for lithium secondary batteries, comprising:

0.05 mass % to 2.0 mass % of a compound represented by the following Formula

[C1]

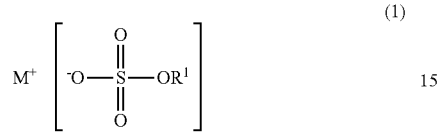

(1)

wherein the compound of formula (1) is at least one selected from the group consisting of 1,3-dimethylimidazolium methyl sulfate, 1-butyl-3-methylimidazolium methyl sulfate, N-methyl-N-propylpyrrolidinium methyl sulfate, and tetraethylammonium methylsulfate.

2. The electrolyte solution for lithium secondary batteries according to claim 1, wherein the content of the compound represented by Formula (1) is 0.5 mass % to 1.0 mass %.

3. A lithium secondary battery, comprising the electrolyte solution for lithium secondary batteries according to claim 1.

* * * * *